A. CARLSON & O. KARLSON.
SPRING WHEEL.
APPLICATION FILED JUNE 25, 1908.

916,842. Patented Mar. 30, 1909.
2 SHEETS—SHEET 1.

Witnesses
Inventors
Axel Carlson
Olof Karlson
By Cochran & Co.
Attorneys

A. CARLSON & O. KARLSON.
SPRING WHEEL.
APPLICATION FILED JUNE 25, 1908.

916,842.

Patented Mar. 30, 1909.
2 SHEETS—SHEET 2.

UNITED STATES PATENT OFFICE.

AXEL CARLSON AND OLOF KARLSON, OF SIOUX CITY, IOWA.

SPRING-WHEEL.

No. 916,842.  Specification of Letters Patent.  Patented March 30, 1909.

Application filed June 25, 1908. Serial No. 440,330.

*To all whom it may concern:*

Be it known that we, AXEL CARLSON and OLOF KARLSON, citizens of the United States, residing at Sioux City, in the county of Woodbury and State of Iowa, have invented certain new and useful Improvements in Spring-Wheels, of which the following is a specification.

This invention relates to certain new and useful improvements in vehicle wheels and more especially to that class designed for use upon motor vehicles.

The present invention has for its objects among others to provide a wheel with an elastic telescopic tire which will avoid all of the objections to ordinary rubber pneumatic tires, and also avoiding the necessity of inflating the same and dispensing with liability of puncture.
Another object of the invention is to dispense with the wooden rim heretofore used, employing in lieu thereof a metallic rim in which the cushion tire is retained. The metallic rim is formed in sections and within the same are disposed springs of substantially U-shape to provide the requisite resiliency. Between the metallic rim and the inner rim to which the spokes are attached there are interposed bands or rings of rubber, cork, or other suitable material which serves to exclude dust or water and yet allowing ease of play of the telescopic rim.

Other objects and advantages of the invention will hereinafter appear and the novel features thereof will be particularly pointed out in the appended claim.

The invention is clearly illustrated in the accompanying drawings, which, with the numerals of reference marked thereon, form a part of this specification, and in which—

Figure 1:
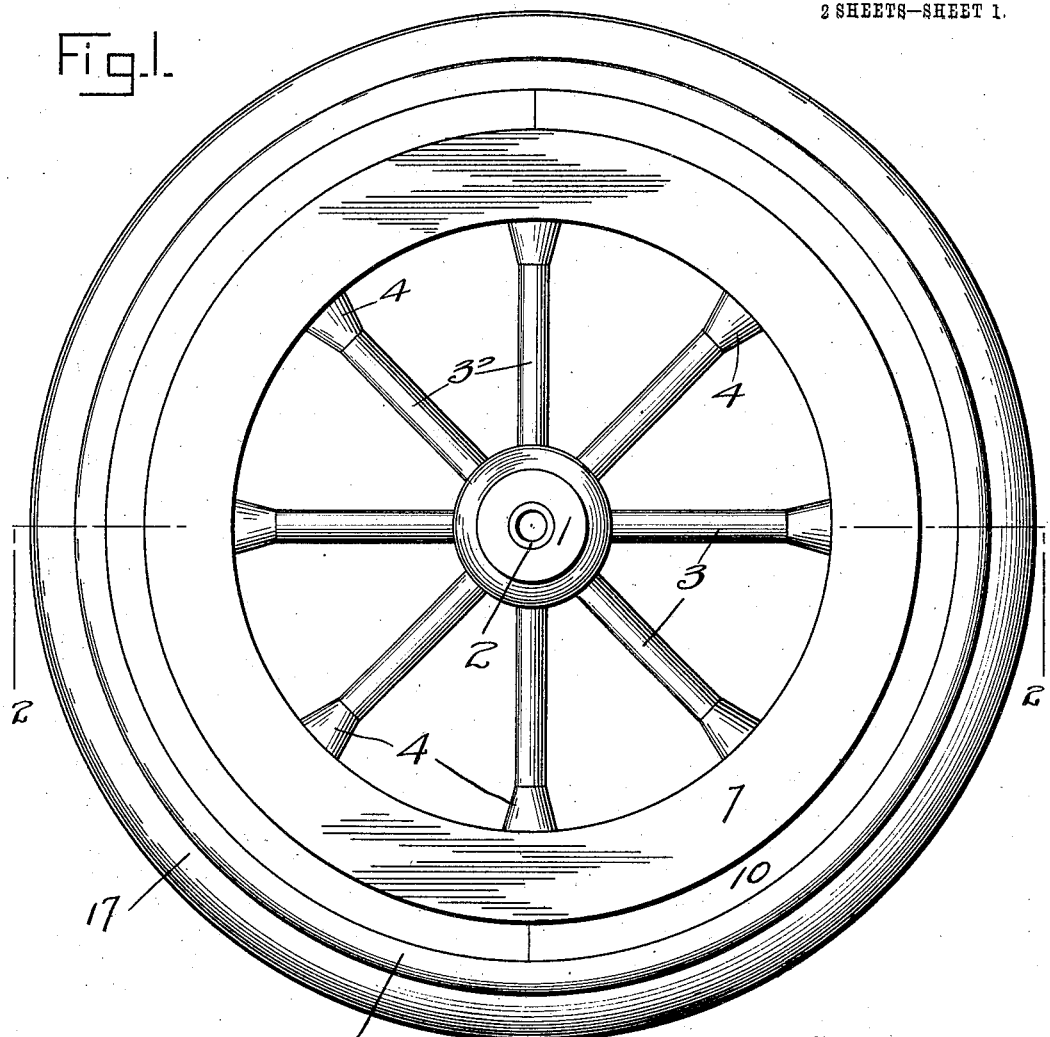
Figure 2:
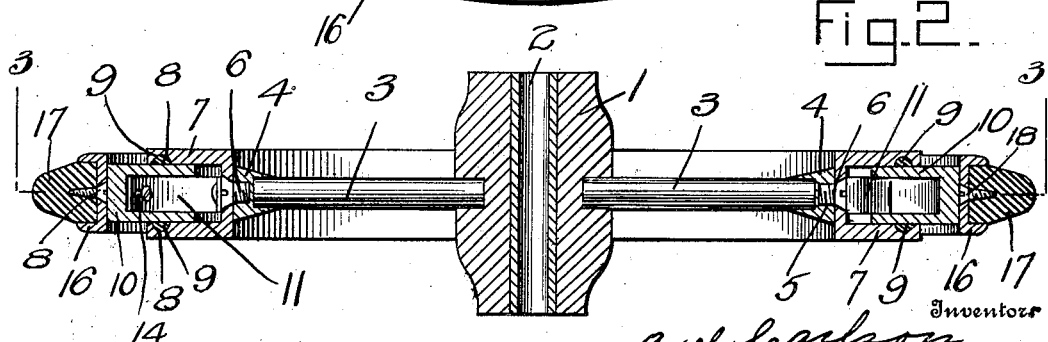
Figure 3:
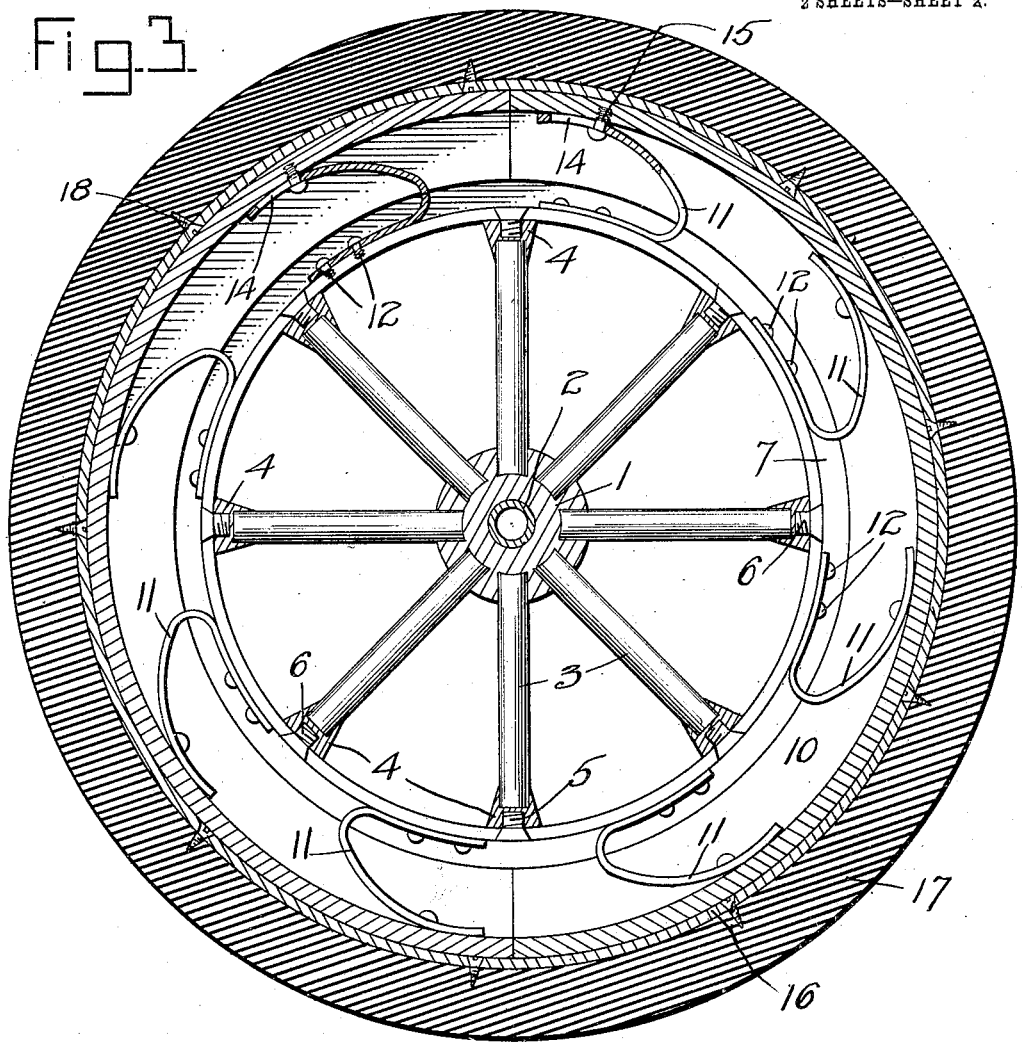
Figure 4:
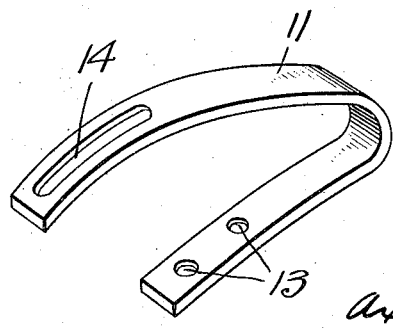

Figure 1 is a side elevation of a wheel embodying our invention. Fig. 2 is a substantially central section through the same as on the line 2—2 of Fig. 1. Fig. 3 is a substantially central section through the wheel at right angles to the section of Fig. 2, as on the line 3—3 of the latter figure. Fig. 4 is a perspective view of one of the springs removed.

Like numerals of reference indicate like parts throughout the several views.

Referring to the drawings 1 designates the hub with bushing 2.

3 are spokes radiating from the hub, in which they are secured in any suitable manner.

4 are cone-shaped members into which the outer ends of the spokes are received, there being one placed on each spoke before the inner rim is set solid thereon. These cone-shaped members are provided with screw-threaded openings, as seen at 5, for the reception of the screws or bolts 6 which secure the inner rim 7 to the spokes, as seen clearly in Figs. 1 and 3. This rim 7 is of channel shape, as seen clearly in Fig. 2, and through the inner peripheral wall of which the said screws 6 are passed, as seen best in Fig. 2. The side walls of this inner rim are provided upon their inner faces with the annular grooves 8, as seen best in Fig. 2, in which are received the rings 9 of rubber, cork, or any other suitable material so as to form a dust and water tight joint between the inner walls of said inner tire and the outer walls of the telescopic metallic rim 10. This rim is of channel shape, as seen in Fig. 2, being arranged reversely to the inner rim and adapted to slide therein. This telescopic metallic rim is formed in sections, in this instance shown as two in number, as seen clearly in Figs. 1 and 3.

11 are springs of substantially the form shown in Figs. 3 and 4 being secured at one end by suitable means as rivets or screws 12 to the inner peripheral wall of the inner rim 7, as seen in Fig. 3, the said securing means 12 passing through holes 13 in one end of the spring, the other end of the spring being provided with an elongated slot 14 in which is received a screw or other means 15 secured in the inner peripheral wall of the telescopic metallic rim 10, as seen clearly in Fig. 3, to permit of the necessary movement in the direction of the length of the spring as the latter are put under compression.

16 is the outer metallic rim, of channel form, as seen best in Fig. 2, and within the channel thereof is secured a cushion or other suitable tire 17 in any suitable manner, as by the screws or analogous means 18, as seen in Fig. 2.

With the parts constructed and arranged as hereinbefore described, it will be readily understood that the tire will give in passing over obstructions or rough places, and that we have provided a construction in which the objectionable features of wheels as now constructed for automobiles, etc. are not present.

Modifications in detail may be resorted to without departing from the spirit of the invention or sacrificing any of its advantages.

What is claimed as new is:—

In a wheel of the character described, a hub, spokes secured thereto, an inner channel rim secured to the spokes, a metallic rim of channel form with its side walls received within and telescoping with the side walls of the inner rim, substantially U-shaped springs having one end fixedly secured to the inner rim and the other ends provided with elongated slots, means secured to the metallic rim and having loose connection with said slots, the ends of the springs extending in substantially the same direction around the wheel with the slotted ends thereof having sliding engagement with the metallic rim, and an outer metallic rim embracing the first-mentioned metallic rim and provided with a tire.

AXEL CARLSON.
OLOF KARLSON.

Witnesses:
H. A. BARR,
H. M. CUMMINS.